Patented Oct. 24, 1950

2,526,668

UNITED STATES PATENT OFFICE 2,526,668

TRIAZINE BRIGHTENING AGENTS FOR ORGANIC MATERIALS AND PROCESS FOR THEIR MANUFACTURE

Ernst Keller and Reinhard Zweidler, Basel, Switzerland, assignors to J. R. Geigy A. G., Basel, Switzerland, a Swiss firm No Drawing. Application October 18, 1948, Serial No. 55,232. In Switzerland October 24, 1947

6 Claims. (Cl. 260—249.5)

The present invention is concerned with the manufacture of brightening agents for organic materials, in particular for animal fibres, possessing a more or less white to faintly yellowish appearance or which are dyed in light shades. The new brightening agents or optical bleaching agents are especially suitable for brightening goods containing or consisting of wool. They are distinguished by having better properties than any bleaching agents for wool so far known.

Compounds from the most varied chemical classes have already been proposed for use as optical bleaching agents, including among others, derivatives of 4:4'-diaminostilbene, some of which have become of considerable practical importance. Thus, by reacting 4:4'-diaminostilbene-2:2'-disulphonic acid with 2 mols of cyanuric halide and replacing the remaining halogen atoms by amino groups, optical bleaching agents are obtained which are outstanding for their intense blue fluorescence and pronounced substantive character. This latter property makes them very suitable for the brightening of cellulose fibres. A further improvement in this field was achieved when 4:4'-di-(aminotriazinyl)-diaminostilbene-sulphonic acid compounds were reacted with formaldehyde to produce optical bleaching agents with considerably improved fastness to laundering when used on cellulose fibres. However, these products are unsuitable for animal fibres, particularly wool, since, as strongly substantive compounds, they have only small affinity for wool. Other compounds which have been suggested as optical bleaching agents are: 4:4'-di-aroylamino- and 4:4'-diureido-stilbene-2:2'-disulphonic acids. It is true that both possess affinity for wool, but they have the disadvantage of a reddish fluorescence, thus giving an unpleasant reddish appearance to the treated wool. Furthermore these compounds are not sufficiently fast to light.

The surprising discovery has now been made that 4:4'-diaminostilbene derivatives of the general formula

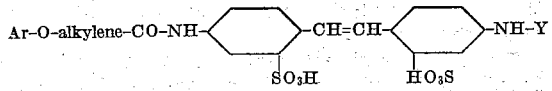

wherein Ar means an aromatic radical,
alkylene means an alkylene radical and
Y means the radical of a 1:3:5-triazine ring which may be substituted in the 3:5-positions, by primary, secondary or tertiary amino groups, are excellently suited for use as optical bleaching agents for wool, since they have good affinity for the wool fibre, have the very much sought after blue to bluish-green fluorescence and, finally, possess on wool very good fastness to light and wet conditions.

The new optical bleaching agents increase the whiteness of undyed wool considerably and give a remarkable brilliance to wool dyed in light shades.

The new compounds are characterised by the presence of the Ar—O—alkylene—CO— grouping, particularly by the bivalent bridge —O—alkylene between the aromatic radical Ar and the —CO— group of the acyl radical. The grouping —O—CH₂— is especially noteworthy, since compounds having this bridge represent the most valuable brightening agents of the new type of compounds.

The new brightening agents are obtained from 4:4'-diaminostilbene compounds mono-acylated by the Ar—O—alkylene—CO— grouping by reacting with 1 mol of a halogen-1:3:5-triazine compound and, if desired, exchanging further halogen atoms of the triazine ring for other groups, e. g., for a hydroxyl, amino, alkyl, aralkyl, cycloalkyl or arylamino group. Alternatively N-mono-1:3:5-triazinyl derivatives of 4:4'-diaminostilbene compounds may be treated with acylating agents introducing the Ar—O—alkylene—CO— group and, when desired, the halogen atoms present in the triazinyl radical exchanged for other groups listed above. As acylating agents suitable for introducing the Ar—O—alkylene—CO— grouping there may be mentioned, for example, aryloxy fatty acid halides, particularly derivatives of lower fatty acids. Those compounds acylated by an aryloxyacetic acid radical are especially valuable, especially the phenoxyacetyl and cresoxyacetyl compounds. 4:4'-diaminostilbene derivatives suitable for use according to the invention, monoacylated by the Ar—O—alkylene—CO— grouping or substituted on one side by a 1:3:5-triazinyl radical are obtained particularly easily from 4-amino-4'-nitrostilbene-2:2'-disulphonic acid by acylation or reaction with a halogen-1:3:5-triazinyl compound respectively followed by reduction of the nitro group. The acylation reaction can often be carried out with advantage in a two phase system, for example, in a benzene-water mixture, while stirring well and adding, where necessary, acid-binding agents such as, for example, sodium acetate, sodium carbonate, sodium bicarbonate, calcium or magnesium carbonate or magnesium oxide. The reaction with the halogen-1:3:5-triazine compound is carried out by known methods.

The new bleaching agents are colourless or faintly yellowish, water-soluble powders and can be used for brightening the most varied kinds of organic material, for example, vegetable or animal fibres, synthetic fibres, such as super polyamides and so on, or materials made therefrom. It is possible so to brighten only slightly bleached material that the result achieved is equivalent to a full bleaching, whereby the material is spared possible damage to a large extent. As previously emphasized, the new compounds are particularly suited for brightening wool. They are applied for this purpose by the acid wool-dyeing method, being allowed to draw out of a hot, acid "dyebath." They are also very suitable for the production of brilliant pastel colours with acid dyestuffs, the dyeing being carried out before, after, or, more conveniently, at the same time, as the brightening treatment.

The following examples serve further to illustrate the manufacture and use of the new optical bleaching agents without restricting the invention in any way, however. Parts are by weight, unless otherwise stated. Temperatures are given in degrees centigrade.

*Example 1*

54.8 parts of the nitro compound prepared by condensing 40 parts of 4:4'-nitroaminostilbene-2:2'-disulphonic acid with 18.5 parts of cyanuric chloride as described in U. S. Patent 2,368,844 are reacted in aqueous solution, first at 20–25°, then at 90–95° with 28 parts of concentrated ammonia. The reaction product is reduced with iron and hydrochloric acid by the Béchamp method and the reduction product treated at room temperature in aqueous solution in the presence of an acid-binding agent such as, e. g., 17 parts of sodium acetate, with 21 parts of phenoxyl-acetyl chloride in 250 parts of benzene, while stirring well. After acylation is completed the compound produced is salted out, isolated and purified, if necessary, by re-precipitation, possibly with the use of agents which are suitable for adsorbing or destroying faintly coloured by-products. When dry, the product so obtained is a faintly yellowish powder. It draws from aqueous solution in a weakly acid bath on to wool, to which it gives a pure white appearance in daylight, especially when the wool is already slightly pre-bleached. In addition, the brightening effect produced is very fast to water, laundering and to light. The compound is also adapted for brightening cellulose fibres, since it draws from a bath containing Glauber's salt, for example, on cotton, staple fibre and the like, upon which fibres it has a similar strong brightening effect. Here too, the fastness to light and to wet conditions is good.

Compounds with similar properties are obtained by replacing the two halogen atoms of the 1:3:5-triazine ring in the compound described above by dimethylamine or diethanolamine instead of ammonia.

*Example 2*

The nitro compound obtained by condensing 18.5 parts of cyanuric chloride, 40 parts of 4:4'-nitroaminostilbene-2:2'-disulphonic acid and 20 parts of aniline is reduced to the amino compound by the process given in Example 1. The reduction product is then reacted in a mixture of benzene and water with 21 parts of phenoxyacetyl chloride, the product isolated and purified, if required. When dry it is a faintly yellowish powder which draws on to pre-bleached wool from an aqueous, weakly acid bath, producing a pure white appearance. The material optically bleached in this way has excellent fastness properties towards water and laundering as well as good light-fastness. The same strong white-effect is also produced on cotton and other cellulose fibres from baths containing salt, likewise with every good fastness properties.

Products with almost the same properties are obtained when 24 parts of monomethylaniline are used instead of aniline in making the cyanuric condensation product. If only the second halogen atom is replaced by the aniline radical in this condensation, by treating with 9.5 parts of aniline and the third halogen atom replaced either by 17.3 parts of metanilic acid or by ammonia, then the brightening agents obtained also exhibit very valuable properties similar to those of the product described above.

Products of this kind can also be used for addition to soap, soap powders or other washing agents; household washing laundered with them has a whiter appearance than that laundered in the ordinary way.

*Example 3*

18.5 parts of cyanuric chloride, 40 parts of 4:4' nitroamino-2:2'-disulphonic acid and 28 parts of concentrated ammonia are condensed by the process given in Example 1 the nitro group is reduced and the amino compound obtained reacted with a benzen solution of 22.5 parts of p-cresoxyacetyl chloride in the two phase system. When pure the final product is a faintly yellowish powder suitable for brightening wool, silk and nylon. From a bath containing salt it is also suitable for cellulose fibres. The product also has a very strong whitening effect on paper.

Instead of with ammonia the condensation for the production of the intermediate product may be carried out with 27 parts of m-amonobenzoic acid or with 34.5 parts of metanilic acid. These products all give an excellent brightening effect, whereby good fastness properties to light and under wet conditions as well as excellent fastness to acids and alkalis are present.

*Example 4*

40 parts of 4:4'-nitroaminostilbene-2:2'-disulphonic acid are reacted with 26 parts of 4-chlorophenoxylacetyl chloride by the method given in Example 1 and the nitro group is converted to an amino group. Next 18.5 parts of cyanuric chloride are condensed with 54 parts of the 4-amino - 4' - (4'' - chlorophenoxyacetamino) - stilbene-2:2'-disulphonic acid so obtained and 28 parts of concentrated ammonia solution. After isolation and purification, if required, a faintly yellowish substance is obtained which is an excellent brightening agent for textile fibres. The treated fibres have excellent fastness properties under wet conditions, as well as to acid, alkali and light.

The two residual halogen atoms of the 1:3:5-triazine ring can of course be allowed to react with other primary and secondary amines instead of with ammonia, e. g., with aniline, monomethylamine, p-aminoacetanilide, m-aminobenzoic acid, sulphanilic acid, in which connection two identical or two different amines may be used. Furthermore the compounds described above can be reacted with formaldehyde by the

Example 5

47.9 parts of the reduced condensation product from cyanuric chloride, 4:4'-nitroaminostilbene-2:2'-disulphonic acid and ammonia, whose preparation is described in Example 1, are reacted with 32 parts of 4-chloro-2-methyl-phenoxy-acetyl chloride. The dried powder has a faintly yellowish appearance and when an aqueous solution is used under suitable conditions it gives a whiter appearance to animal as well as to cellulose fibres. Material treated in this way has excellent fastness to laundering and water, very good fastness to acid and alkali as well as good light fastness.

Other radicals may be used for the condensation with cyanuric chloride in the second and third stage instead of that of ammonia, for example, those of aniline, monomethylaniline, or sulphanilic acid may be introduced instead. The properties of these products are little different from those of the ones named above.

Example 6

The condensation product from 18.5 parts of cyanuric chloride, 40 parts of 4:4'-nitroaminostilbene-2:2'-disulphonic acid and 28 parts of concentrated ammonia solution is reduced with iron and hydrochloric acid. An aqueous solution of 47.9 parts of the amino compound thus obtained is reacted, preferably in a two phase system, with a benzene solution of 22.5 parts of phenoxypropionyl chloride, the acyl compound isolated and purified, if desired. The faintly yellowish substance produced is an excellent brightening agent for wool, nylon, cotton and staple fibre.

Compounds with very similar properties are obtained if the equivalent amount of phenoxybutyryl chloride or phenoxyisobutyryl chloride is used instead of phenoxypropionyl chloride.

Example 7

Natural silk is treated at 80° for ½ hour with 0.5% of the condensation product described in Example 1 with the addition of 4% of formic acid. As compared with untreated, faintly yellowish silk the treated sample shows a beautiful pure white shade. A similar brightening effect is obtained with up to 2% of the same condensation product.

Example 8

Nylon is "dyed" with 0.1% of the condensation product described in Example 2, with the addition of 4% of formic acid, for ½ hour on the boiling water-bath. The nylon fabric treated in this way is strongly brightened as compared with the untreated material. A similar effect is obtained by using up to 1% of this condensation product.

Example 9

Pre-bleached wool is dyed for ½ hour with 0.1% Alizarin Light Blue AR (Schultz No. 1199) and 0.2% of the condensation product described in Example 2 with the addition of 3% of formic acid. The dyeing thus produced is distinguished by a much more vivid and clear blue shade than that made without the addition of a brightening agent. It is of course also possible to treat the wool with the brightening agent before dyeing. A similar effect is obtained with up to 1% of this condensation product.

Example 10

0.1–2% of the condensation product described in Example 1 is added in the hollander during the usual paper making process to unbleached sulphite-cellulose, the percentage added depending on the degree of brightening desired. The paper made from the treated mass is clearly distinguishable by its whiter appearance from that made without addition of the condensation product.

The examples which follow show a series of further compounds which are preparable according to the directions given in Examples 1–6. These further compounds also possess the same remarkable properties.

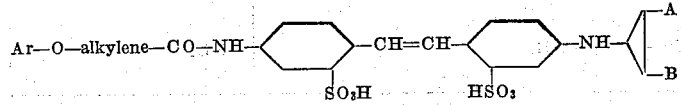

(A and B=substituents of the triazine ring)

| No. | Ar—O—alkylene | A | B |
|---|---|---|---|
| 11 | CH₃—⌬—O—CH₂— | —NH—⌬—SO₂—NH₂ | —NH—⌬—SO₂—NH₂ |
| 12 | Cl—⌬(Cl)—O—CH₂— | —NH₂ | —NH₂ |
| 13 | Cl—⌬(Cl)—O—CH₂— | —NH₂ | —NH₂ |
| 14 | Cl—⌬(Cl)—O—CH₂— | —N(C₂H₄OH)₂ | —N(C₂H₄OH)₂ |
| 15 | ⌬—O—CH₂— | —NH₂ | —NH₂ |

| No. | Ar—O—alkylene | A | B |
|---|---|---|---|
| 16 | naphthyl—O—CH$_2$— | —NH—C$_6$H$_4$—SO$_3$H | —NH—C$_6$H$_4$—SO$_3$H |
| 17 | Cl,Cl-C$_6$H$_3$—O—CH$_2$— | —NH—C$_6$H$_4$—NH—CO—CH$_3$ | —N(CH$_3$)—C$_6$H$_5$ |
| 18 | (OCH$_3$)C$_6$H$_4$—O—CH$_2$— | —NH$_2$ | —NH$_2$ |
| 19 | (OCH$_3$)C$_6$H$_4$—O—CH$_2$— | —N(CH$_3$)—C$_6$H$_5$ | —NH—C$_6$H$_4$—COOH |
| 20 | CH$_3$—O—C$_6$H$_4$—O—CH$_2$— | —NH$_2$ | —NH$_2$ |
| 21 | CH$_3$—O—C$_6$H$_4$—O—CH$_2$— | —NH—C$_6$H$_5$ | —NH—C$_6$H$_5$ |
| 22 | C$_6$H$_5$—CH$_2$O—C$_6$H$_4$—O—CH$_2$— | —NH$_2$ | —NH$_2$ |
| 23 | C$_2$H$_5$—O—CO—C$_6$H$_4$—O—CH$_2$— | —NH$_2$ | —NH$_2$ |
| 24 | CH$_3$—CO—NH—C$_6$H$_4$—O—CH$_2$— | —NH$_2$ | —NH$_2$ |
| 25 | C$_6$H$_5$—O—CH$_2$—CH$_2$— | —NH$_2$ | —NH$_2$ |
| 26 | C$_6$H$_5$—O—CH(CH$_3$)— | —NH$_2$ | —NH$_2$ |
| 27 | C$_6$H$_5$—O—CH$_2$—CH$_2$—CH$_2$— | —NH$_2$ | —NH$_2$ |
| 28 | CH$_3$—C$_6$H$_4$—O—CH$_2$—CH$_2$— | —NH$_2$ | —NH$_2$ |
| 29 | Cl—C$_6$H$_4$—O—CH$_2$—CH$_2$— | —NH$_2$ | —NH$_2$ |
| 30 | Cl—C$_6$H$_4$—O—CH$_2$—CH$_2$—CH$_2$— | —NH$_2$ | —NH$_2$ |

What we claim is:

1. A brightening agent comprising a compound corresponding to the formula

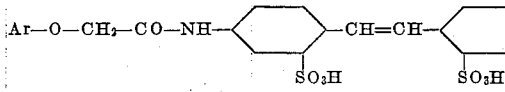

wherein Ar stands for a member selected from the group consisting of aryl radicals of the benzene and naphthalene series, each $R_1$ stands for a member selected from the group consisting of H, alkyl radicals and aryl radicals of the benzene series, and each $R_2$ stands for a member selected from the group consisting of H and alkyl radicals.

2. A brightening agent comprising a compound of the formula

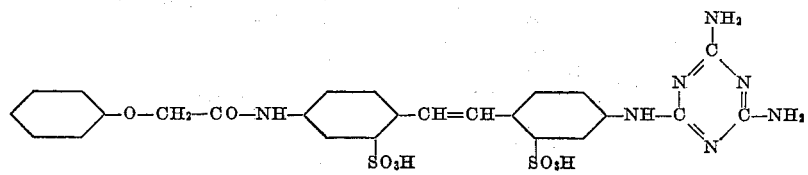

3. A brightening agent comprising a compound of the formula
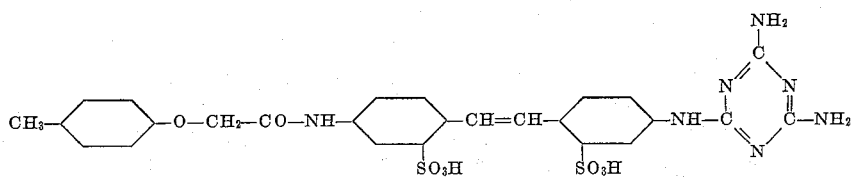
4. A brightening agent comprising a compound of the formula
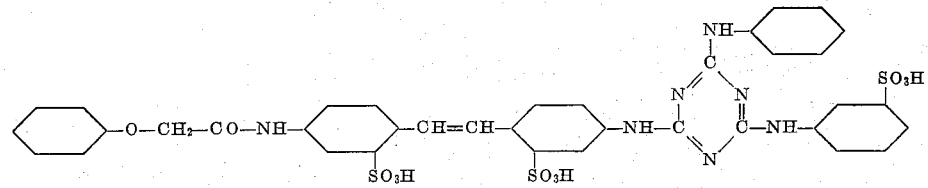
5. A brightening agent comprising a compound of the formula
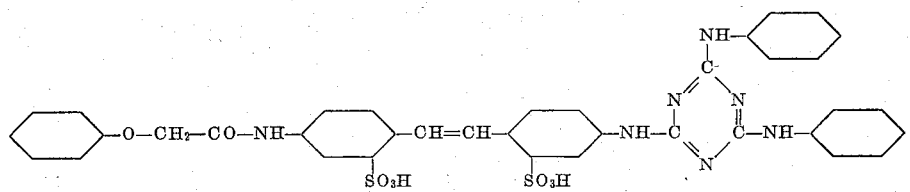
6. A brightening agent comprising a compound of the formula
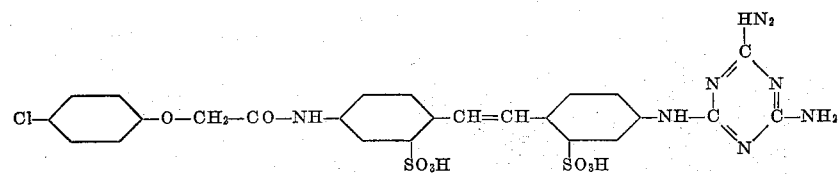
ERNST KELLER.
REINHARD ZWEIDLER.
No references cited.